Figure 1:
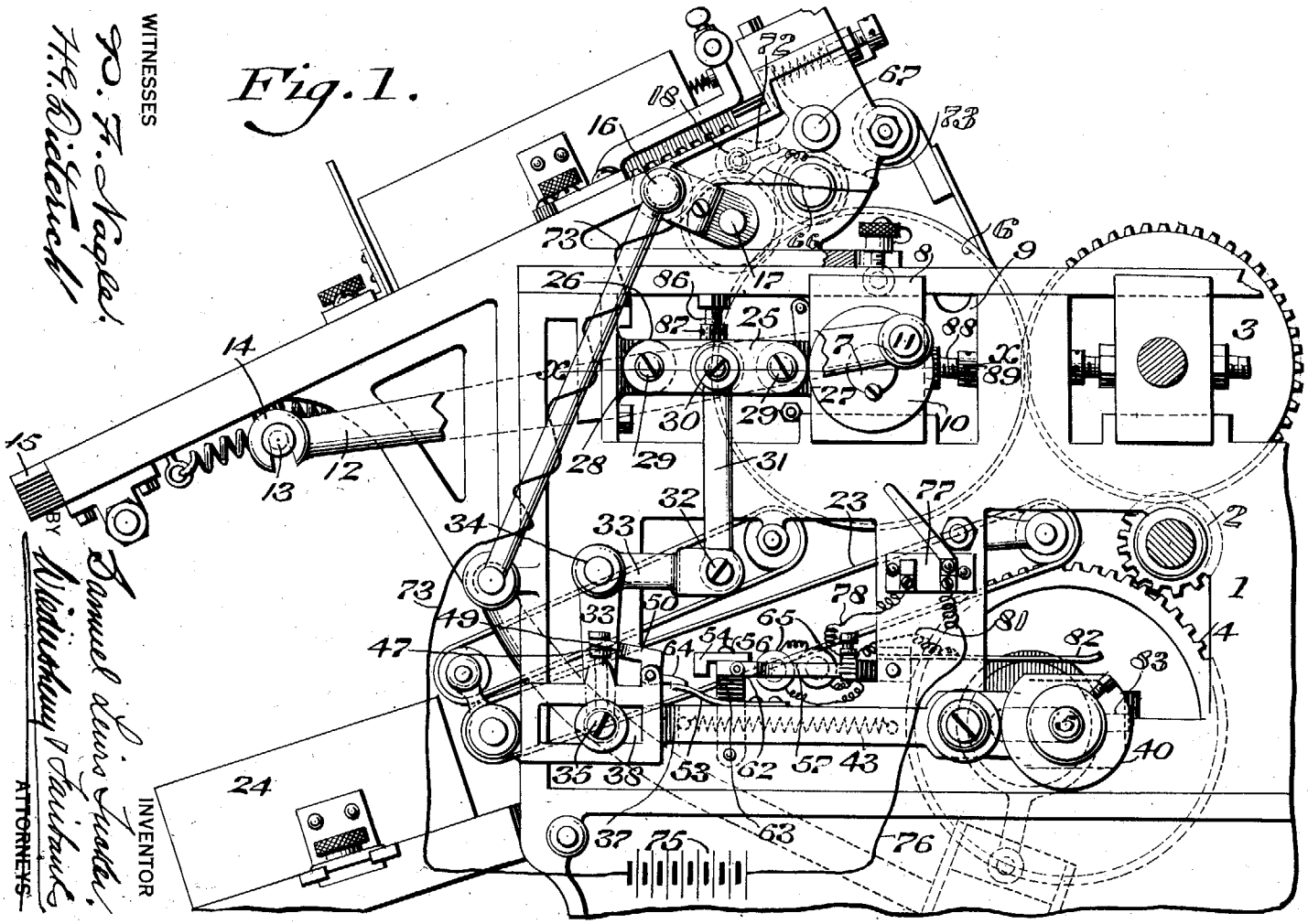

S. L. TUCKER.

AUTOMATIC CONTROL FOR PRINTING PRESSES.

APPLICATION FILED JUNE 17, 1915.

Reissued Sept. 12, 1916.

14,191.

5 SHEETS—SHEET 1.

WITNESSES

P. F. Nagle.

H. G. Dieterich

INVENTOR

Samuel Lewis Tucker,

BY Wiedersheim & Fairbanks

ATTORNEYS

S. L. TUCKER.

AUTOMATIC CONTROL FOR PRINTING PRESSES.

APPLICATION FILED JUNE 17, 1915.

Reissued Sept. 12, 1916.

14,191.

5 SHEETS—SHEET 2.

WITNESSES

P. F. Nagle.

H. G. Dieterich

INVENTOR

Samuel Lewis Tucker,

BY Wiedenshein & Fairbanks.

ATTORNEYS

S. L. TUCKER.

AUTOMATIC CONTROL FOR PRINTING PRESSES.

APPLICATION FILED JUNE 17, 1915.

Reissued Sept. 12, 1916.

14,191.

5 SHEETS—SHEET 3.

WITNESSES

H. C. Dieterich

P. F. Nagle.

INVENTOR

BY Samuel Lewis Tucker.

Wiedersheim & Fairbanks.

ATTORNEYS

S. L. TUCKER.
AUTOMATIC CONTROL FOR PRINTING PRESSES.
APPLICATION FILED JUNE 17, 1915.
Reissued Sept. 12, 1916.
14,191.
5 SHEETS—SHEET 4.
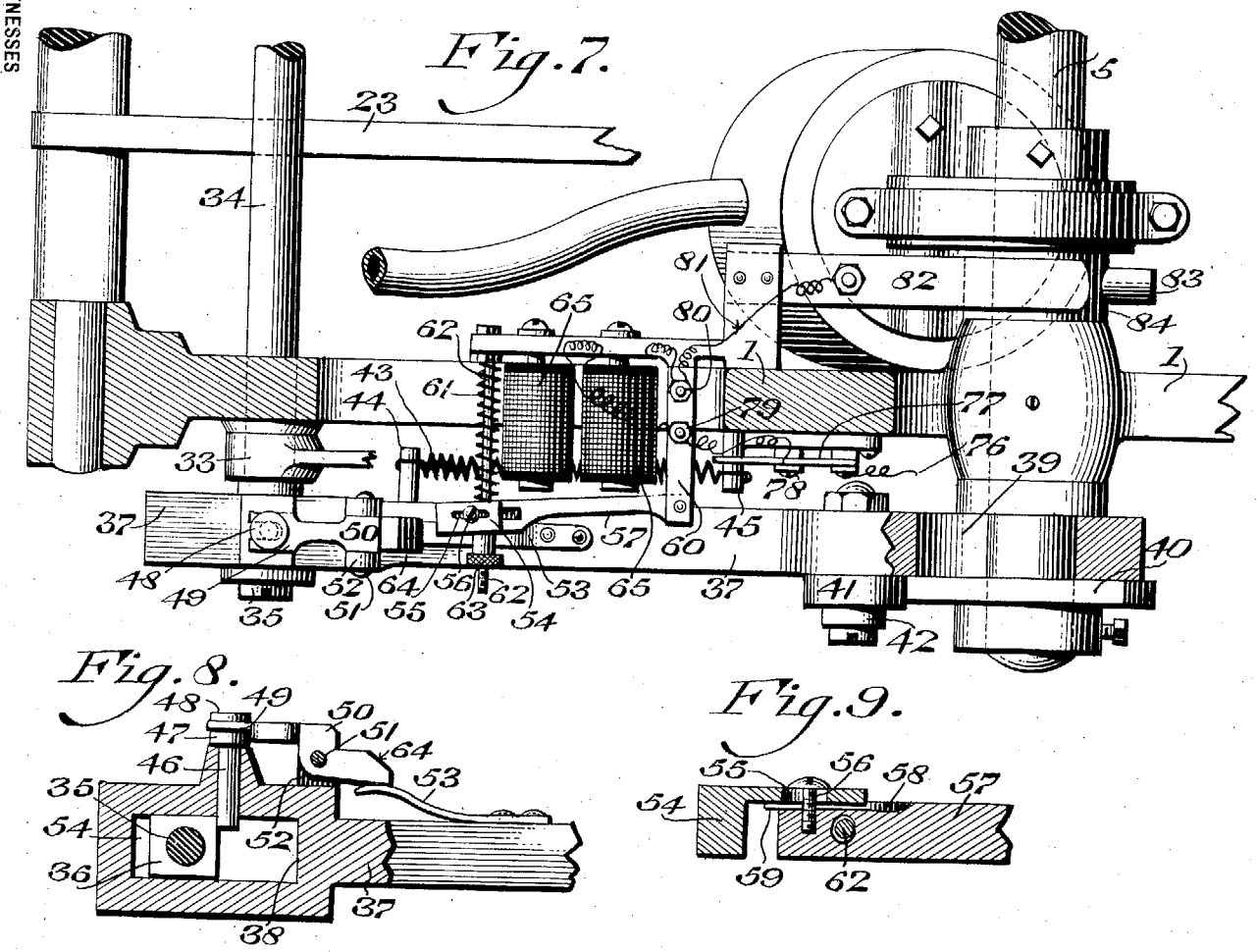
WITNESSES
P. F. Nagle.
H. G. Dieterich
INVENTOR
Samuel Lewis Tucker,
BY
Wiedenshim & Fairbanks.
ATTORNEYS

S. L. TUCKER.

AUTOMATIC CONTROL FOR PRINTING PRESSES.

APPLICATION FILED JUNE 17, 1915.

Reissued Sept. 12, 1916.

14,191.

5 SHEETS—SHEET 5.

WITNESSES

P. F. Nagle.

H. G. Dieterich

INVENTOR

Samuel Lewis Tucker,

BY

Wiedersheim & Fairbanks.

ATTORNEYS

UNITED STATES PATENT OFFICE.

SAMUEL LEWIS TUCKER, OF WOODBURY, NEW JERSEY, ASSIGNOR TO ARTHUR B. HUEY, OF PHILADELPHIA, PENNSYLVANIA.

AUTOMATIC CONTROL FOR PRINTING-PRESSES.

14,191. Specification of Reissued Letters Patent. Reissued Sept. 12, 1916.

Original No. 1,095,751, dated May 5, 1914, Serial No. 714,202, filed August 9, 1912. Application for reissue filed June 17, 1915. Serial No. 34,744.

*To all whom it may concern:*

Be it known that I, SAMUEL LEWIS TUCKER, a citizen of the United States, residing at Woodbury, county of Gloucester, State of New Jersey, have invented a new and useful Automatic Control for Printing-Presses, of which the following is a specification.

This invention relates to printing presses or machines of a similar character involving the feeding of sheets of material between an inking roll and a pressing roll or the like, and relates more particularly to an automatic control mechanism for varying the relation between the printing or impression roll and the press roll whenever a sheet or sheets of material cease to feed. In automatic machines which feed the material sheet by sheet to the machine and then print upon the same, or perform other steps of a similar nature, it frequently happens that the sheet feeding mechanism, for one reason or another, fails to feed a sheet at the proper time and under such conditions, in the present machines, the cycle of operations is carried out just the same by the other parts of the mechanism as though a sheet had been fed and consequently in the case of an impression roll the ink is deposited, not upon a sheet of paper, but upon the press roll. In view of this action the press roll becomes soiled and smeared with ink which is then pressed on the rear side of the following sheets as soon as the feeding action is again resumed.

In my present invention, I have devised a mechanism for obviating and eliminating the aforesaid disadvantages and defects and have devised a mechanism automatic in its operation by means of which the relation between an impression roll and its coöperating members may be varied whenever a sheet of paper fails to feed into the machine and thereby remove one roll from contact with the other and prevent ink being placed or deposited upon the press roll.

It further consists of other novel features of construction, all as will be hereinafter set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 2:
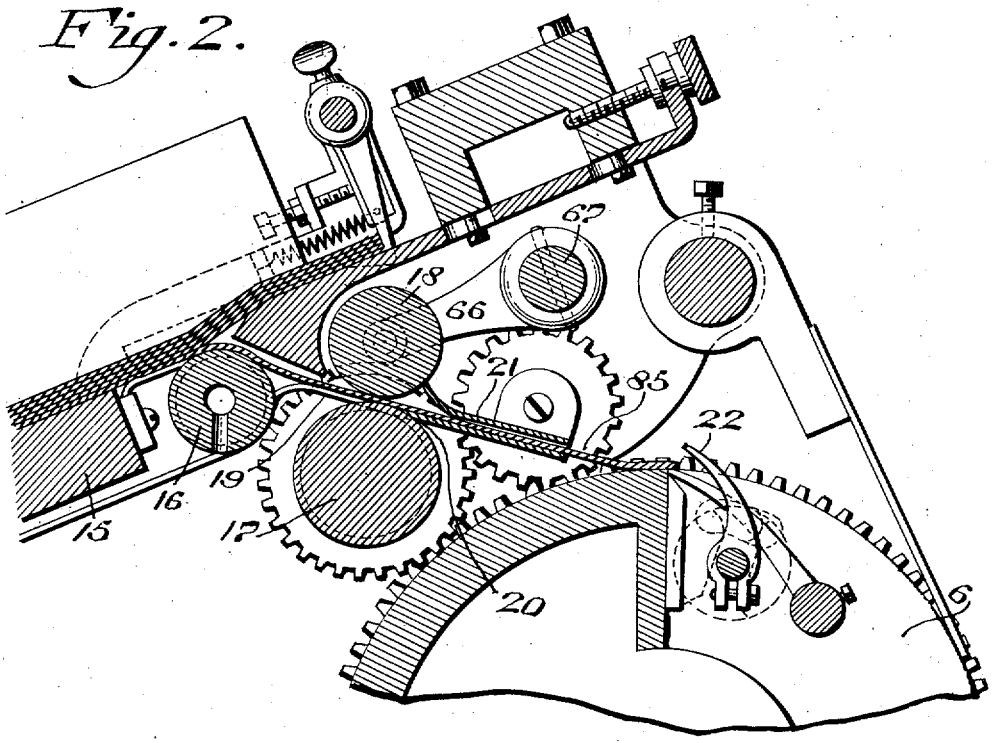
Figure 3:
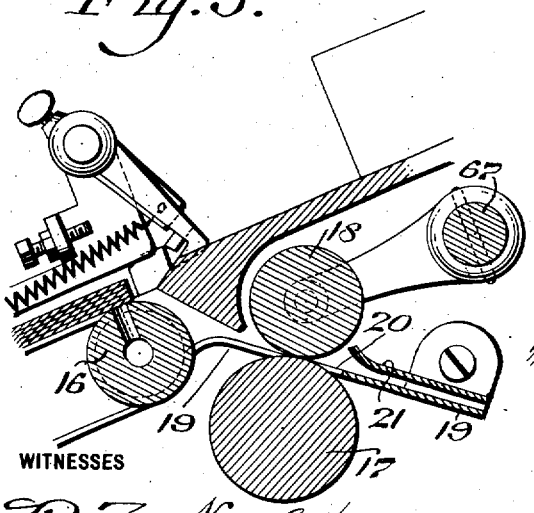
Figure 4:
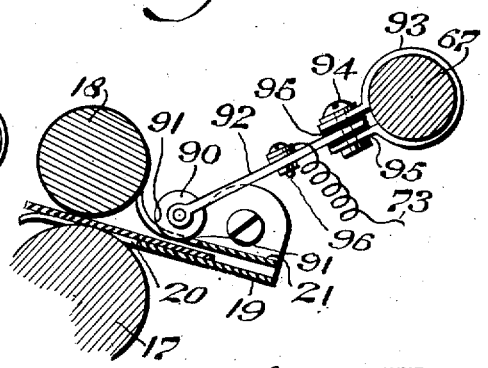
Figure 6:
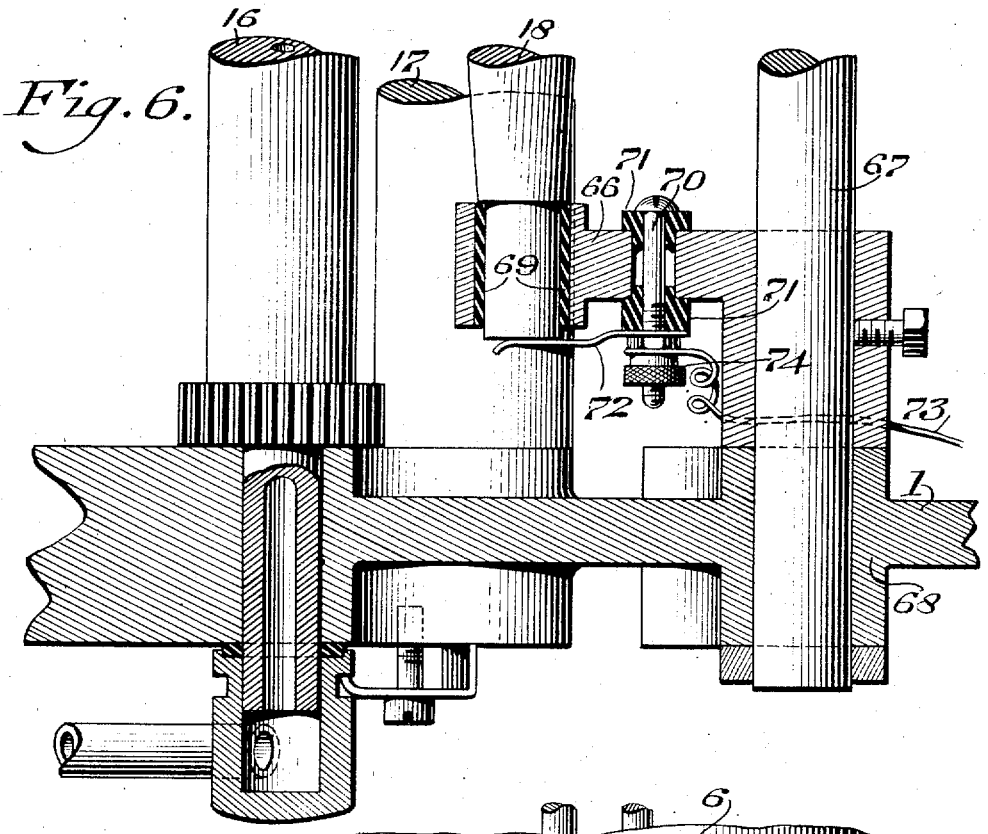
Figure 5:
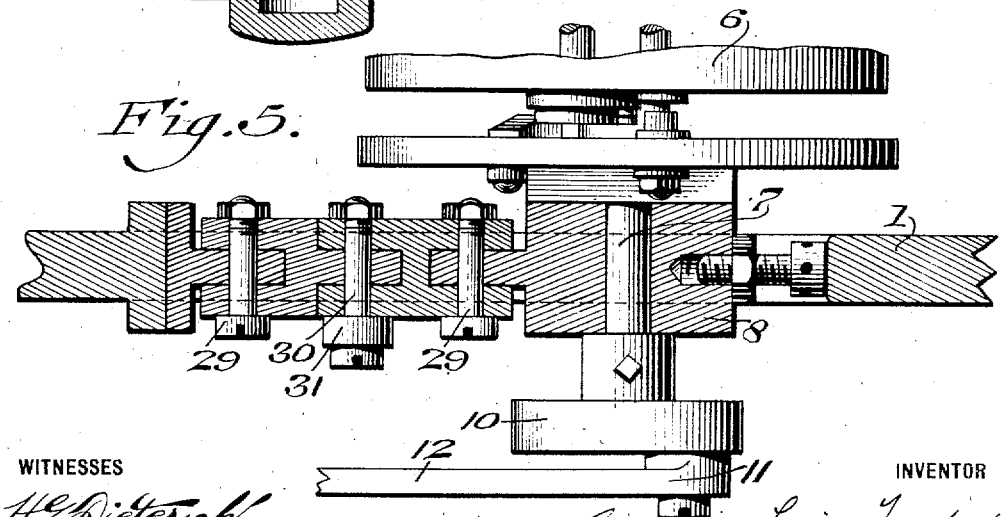
Figure 10:
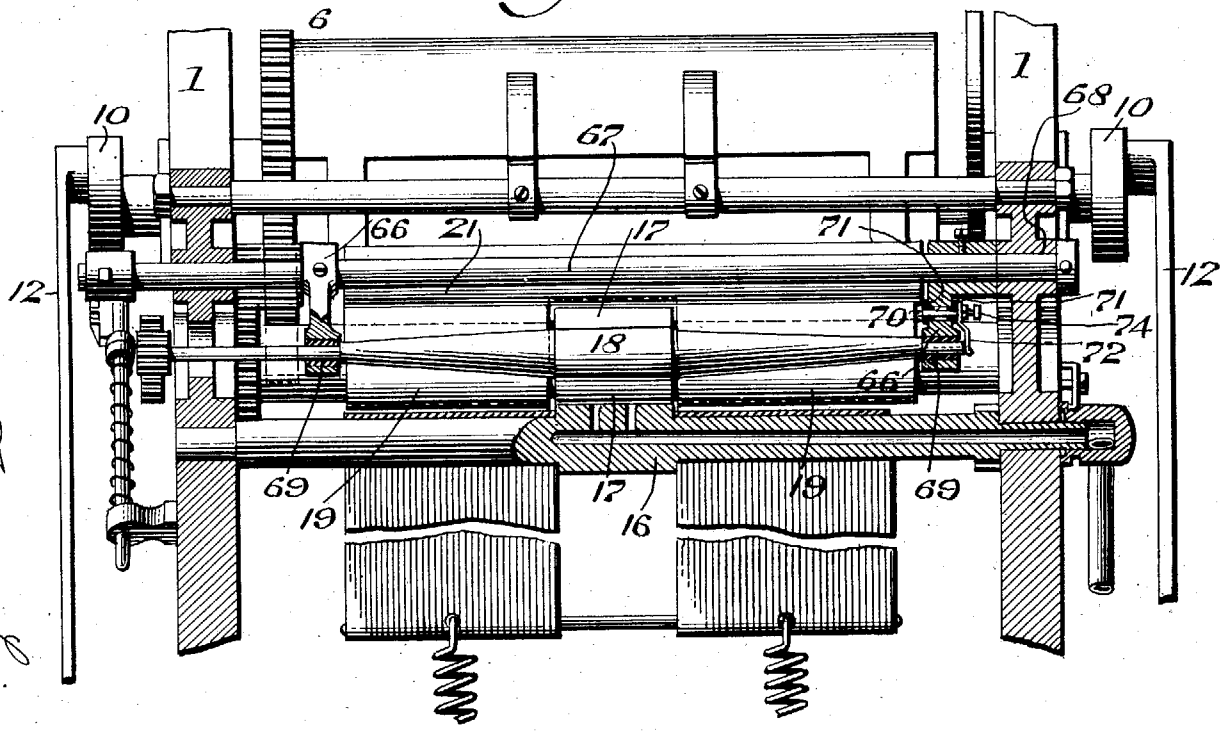

Figure 1 represents a side elevation of a portion of a printing press showing the parts embodying my invention. Fig. 2 represents a vertical section of the paper feeding mechanism disclosing the relation of the feed rolls when a sheet of paper is passing through the said rolls to the printing mechanism. Fig. 3 represents a portion of the mechanism shown in Fig. 2 disclosing the position of the feed rollers when the sheet of material is not in position. Fig. 4 represents a section of the feed rollers disclosing in connection therewith a modified contact device for making and breaking an electrical control circuit. Fig. 5 represents a section on line $x$—$x$ Fig. 1. Fig. 6 represents a plan partly in section of a portion of the material feeding rolls and one terminal of the electric control circuit. Fig. 7 represents a plan of certain portions of the operating mechanism disclosing more particularly the electromagnet control for regulating the actuating mechanism for one of the rolls. Fig. 8 represents a detail partly in section of a portion of the actuating connection for the roll mechanism controlled thereby. Fig. 9 represents a detail of the trigger mechanism carried by the armature of the magnet control. Fig. 10 represents a plan partly in section, of the feed roll mechanism.

Similar numerals of reference indicate corresponding parts in the figures.

Referring to the drawings:—1 designates the frame of a machine in conjunction with which my novel control mechanism is used, and, in the present instance this machine is shown as a printing press having as an adjunct thereof an automatic feed mechanism for the paper or like material. For the purpose of this application, it is not deemed necessary to give a detailed description of the printing press or of its attachment embodying the automatic paper feed and therefore only certain parts will be described in order that a clear understanding may be had relative to the functions of the mechanism embodying my invention.

2 designates the main drive shaft of the printing press, which is suitably geared to cause rotation of the form roll 3 and is likewise in mesh with a gear 4 mounted on a countershaft 5.

6 designates the impression roll which is keyed or otherwise secured to a shaft 7, the ends of which are carried in cross heads 8, which are mounted for sliding movement in apertures 9 formed in the frame 1, the said form roll 3 and impression roll 6 being intergeared as clearly shown in Fig. 1.

It will here be noted that but one side of the machine is shown in the drawings, but in view of the fact that the opposite side is identical with the one shown, it is not thought necessary to encumber the drawings with a duplicate disclosure.

10 designates a crank disk fixed to the shaft 7 and carrying a crank pin 11 to which a connecting rod 12 is secured at one end, its other end being pivotally fastened to a spindle 13 of a lug 14 which is fast to the movable table 15 and by which the latter receives a reciprocating motion. The sheets of paper in the present instance are successively fed forward by the movement of this table and are removed one after the other by mechanism suitable for the purpose and pass over a tubular roll 16 to the feed rollers 17 and 18, it being noted however that a lower guide plate 19 is positioned to receive the paper and has a slot 20 therein through which the periphery of the feed roller 17 projects a sufficient distance to produce the required feeding action. A second guide plate 21 is secured above the plate 19 in any desired manner and suitably spaced therefrom so that the material can readily pass between the two plates and be delivered to the automatically actuated gripping devices 22 which are carried by the press roll 6 and serve to carry the sheet of paper between the press roll and the printing roll for the purposes of printing, as will be apparent. After leaving the printing roll, the paper is delivered by conveyers 23, which are suitably driven, and ejected on the receiving table 24.

In machines of this or like types it frequently happens that one or more sheets of paper fail to feed through the machine at the proper time and consequently the printing roll impresses the ink directly upon the press roll thereby causing the next sheet or sheets of paper to be smeared and coated with ink on the side opposite to the printing surface, and it is an object of my invention to provide a mechanism for obviating and eliminating this disadvantage. In order to effect this result, I have in the present embodiment of my invention shown a mechanism whereby the relation between the impression roll and the form roller is varied without stopping the rotation of either whenever a sheet of paper fails to pass through the feeding roll, and for the purposes of the disclosure I have preferred to utilize a mechanism for shifting the press roll, although it will of course be understood that I do not wish to be limited to the exact construction shown or to the shifting of the press roll as a means to the desired end.

The movement of the impression roll 6 is controlled in the present instance by a mechanism which operates to shift the journal blocks 8 relative to the main frame 1 and consists of toggle levers 25 and 26, the former being pivotally secured to a lug 27 of the block 8 and the latter to a bracket 28 fixed to the frame 1, it being understood that the relative movement between the rolls is effected without disconnecting their driving gears and therefore without stopping the rotation of either. Suitable fastening bolts 29 or the like are utilized to secure the parts together in order to permit the proper movement.

30 designates a pin or bolt joining the two links 25 and 26 together and serving as a pivot which may be shifted to split the toggle and cause the blocks 8 to move in a direction away from the form roll 3. This action is controlled by a link 31 secured at one end of the pivot pin 30 and at the opposite end is pivoted at 32 to one arm of a bell crank 33, the latter being pivoted at 34 to the frame 1 and carrying on the opposite arm thereof a wrist pin 35 to which is secured a block 36.

37 designates a reciprocable crank arm one end of which is preferably provided with a substantially rectangular slot 38 adapted to receive the block 36 with respect to which the arm 37 may have a sliding action. The opposite end of the arm 37 is provided with a slot 39 through which the countershaft 5 passes so that proper reciprocation of the arm 37 may take place. The desired movement is imparted to the arm 37 in the present instance by means of a cam 40 fixed to the shaft 5 and adapted to engage a cam roller 41 carried by a pin 42 suitably fixed to the arm 37. After a movement of the arm 37 by the action of the cam 40 the return stroke takes place, as here shown under the influence of a spring 43 the ends of which are respectively connected to a pin 44 of the arm 37 and a pin 45 of the frame 1. It will thus be seen that as the shaft 5 rotates, a free reciprocation of the arm 37 will take place and as long as there is no connection between the block 36 and the said arm 37 there will be no movement of the impression roll actuating mechanism embodying the bell crank 33 and its adjuncts.

In order to cause the desired rocking movement of the bellcrank 36, I provide in the present instance a pin 46 mounted for sliding movement in the arm 37 and of sufficient length to project at certain times within the slot 38 in order to engage the block 36. This pin 46 is provided with a head 47 which seats on the arm 37 and is circumferentially recessed at 48 to receive the bifurcated end 49 of a lever 50 which is pivoted at 51 in ears 52 of the arm 37, the said lever 50 engaging a spring 53 riveted or otherwise secured to the arm 37 and by which it is normally held in the position shown in Fig. 8, that is, with the pin 46 projecting into the slot 39. It will be noted that a clearance space 54× is preferably provided at one side of the block 36 in order to insure the pin 46 returning to the position shown in Fig. 8 after a movement which has removed the said pin out of contact with the block 36. The withdrawal of the pin 46 from the path of the block 36 is effected in the present instance by means of a trip finger 54 which is adjustably secured by a slot 55 and fastening device 56 to an armature member 57, the latter being provided with a longitudinal groove 58 seated within which is a liner 59, the function of which is to prevent lateral turning of the finger 54 on its support and maintain the same in correct operative position. The armature 57 is pivoted to a suitable frame 60 carried by the main frame 1 and is normally maintained in the path of movement of the lever 50 through the medium of an expansion spring 61 carried by a rod 62, the latter being mounted on the frame 60 and threaded to receive a thumb nut 63 by which the tension of the said spring may be varied. In connection with the engagement of the lever 50 with the finger 54 it will be noted that the former is preferably provided with a beveled face 64 to insure the proper turning movement of the lever 50 when it is engaged by the finger 54. The armature 57 is controlled by a pair of magnets 65 on the frame 60 and their energization is effected by the closing of an electric circuit controlled by the feed roller 17 and the feed roller 18 or equivalent contact means operated by the movement of a sheet of paper through the aforesaid feed rollers. In connection with the feed roller 18, it will be noted that the same is supported in such a manner that it is normally in contact with the feed roller 17 but may be moved away from the same under the action of a sheet of paper feeding between the two rollers. The support for the feed roller 18 comprises in the present instance a pair of arms 66 (but one being shown for purposes of illustration) fixed to a spindle 67 freely movable in suitable journals 68 of the frame 1. These arms are of course apertured to receive a portion of the feed roller 18 and attention is directed to the fact that an insulating bushing 69 is interposed between the feed roll 18 and its supporting arm 66 for the purpose of electrically disconnecting the feed roller 18 from the machine frame 1 or its adjuncts, since as will later appear, the frame 1 forms one terminal of the circuit previously mentioned.

70 designates a binding post fixedly secured to the arm 66 and insulated therefrom by suitable material 71, the said post carrying a contact clip 72 which is under sufficient tension to retain it in electrical contact with the feed roll 18.

73 designates a conductor wire connected at one end to the binding post 70, by means of the usual thumb nut 74, and at its other end connected to the positive terminal of a battery 75.

76 designates the conductor wire leading from the negative side of the battery, in the present instance to a knife switch 77 from which the circuit continues by way of wire 78 to binding post 79 thence through the magnets 65 to binding post 80. A wire 81 is led from the binding post 80 and secured to a spring arm 82 forming a part of a make and break device of which the other adjunct is a pin 83 fixed to a sleeve 84 which rotates with the shaft 5, it being seen from Fig. 1 that the spring arm 82 is at all times out of contact with the sleeve 84 but in the path of movement of the pin 83 and therefore at each revolution of the pin 83 the circuit will be grounded on the main frame 1. The current thus passes through the frame 1 to the uninsulated feed roller 17 which thus becomes one terminal of the circuit of which the feed roller 18 in the present instance is the other terminal. The make and break pin 83 is of course so positioned and located on the shaft 5 so as to time its contact with the arm 82 relative to the cycle of operations of the paper feeding mechanism, since it will be understood that it is not necessary to maintain a closed circuit at all times and thus waste the batteries, the closing of the circuit being only necessary when a sheet of paper should be in position between the feed rollers 17 and 18.

In explaining the operation of my novel mechanism, it will be assumed first that the paper is feeding in a correct manner through the machine and that a sheet is located between the feed rolls 17 and 18, as shown in Fig. 2, and then it will be assumed that there has been a break in the continuity of the feed and that a sheet of paper has failed to feed and the parts are in position shown in Fig. 3.

With the above statement in mind, it will be clear by reading Figs. 1 and 2 together, that when a sheet of paper is fed into the position shown in Fig. 2, the feed rollers 17 and 18, which are the terminals of the circuit, will be spaced apart and the circuit broken at this point. Therefore with the pin 83 in contact with the spring contact 82, this being its position at this time, there will be no current in the circuit and consequently the magnets 65 are de-energized so that the armature 57 is held away from the magnets by the spring 61 and is in the position shown in Fig. 7, namely in the path of the lever 50 carried by the reciprocating arm 37. Since the arm 37 is constantly reciprocating, the beveled face 64 of the lever 50 will strike the finger 54, depress the spring 53 and raise the pin 46 in the wall of the slot 38 in which position it cannot engage the block 36. In consequence of this action the reciprocating arm 37 will move entirely free of the block 36 and the impression roll 6 remain in its normal position in contact relation with the form roll 3 so that the paper may be carried between the two rolls to print and receive an impression.

Referring now to Fig. 3, it will be assumed that a sheet of paper has failed to feed to the said rollers 17 and 18 and consequently when the pin 83 makes a circuit with the contact spring 82 the circuit will be closed since the two rollers 17 and 18 are in contact. The closing of the circuit will energize the magnets 65 which thereupon draw the armature 57 out of the path of the lever 50 and the pin 46 remains in the position shown in Fig. 8 and on the stroke of the arm 37 to the left, as shown in this figure, the pin 46 will shift the block 36 and thus rock the bell crank 33. The movement of the bell crank pulls the link 31 downwardly, as shown in Fig. 1, breaking the toggle levers 25 and 26, so that the blocks 8 are moved away from the form roll and carry the impression roll with them and out of contact with the said form roll, but without disconnecting their interconnecting gears. It will thus be seen that when the throw-out mechanism is in operation, the press will operate at the same speed and the form roll and impression rolls are always in continuous rotation. There will therefore be no ink deposited on the roll and the parts are not restored to their operative position until a sheet of paper is again fed between the rolls 17 and 18. When this occurs the circuit is of course broken, the magnets 65 deënergized and the armature 57 restored to its position to engage the lever 50 and raise the pin 46 to disconnect the press roll actuating mechanism and the reciprocating arm 37.

In connection with the toggle members 25 and 26 it will be noted that I preferably employ a threaded stud 86 which is fast to the frame 1 and carries a threaded head 87 which is adjustable thereon and serves as a stop to limit the movement of the toggle levers and insuring the parts reaching the correct position. A similar stud 88 and head 89 are utilized in connection with the movement of the blocks 8 thereby permitting proper adjustment between the impression roll 6 and form roll 3.

In Fig. 4 I have shown a modification of the circuit closing mechanism controlled by the sheet of paper, the same consisting in the present instance of a contact roll 90 suitably mounted so that a portion thereof passes through an opening 91 in the guide plate 21. This roll is carried by an arm 92 fixed to the clamp 93 by suitable fastening devices 94, it being noted, however, that suitable insulating material 95 is interposed between the said clamp and arm so that there will be no electrical contact between the two. This clamp 93 is preferably mounted on the spindle 67 heretofore referred to. The terminal wire 73 in this embodiment of the invention joins the arm 92 by a binding post 96 and the closing and opening of the circuit takes place in substantially the same manner as that previously described for the feed rollers 17 and 18 although in this instance the plate 19 is the terminal which is grounded on the machine frame instead of the roller 17.

It will now be apparent that I have devised a novel and useful construction of an automatic control for printing presses which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a printing press, the combination of an impression roll, a form roll operatively mounted with respect thereto, an automatic material feed mechanism adapted to successively feed sheets of material, a pair of feed rolls interposed between said mechanism and said form roll, an electric circuit having said feed rolls as terminals, a make and break device for controlling said circuit at a predetermined time, a suitably driven reciprocatory member, means connected to said impression roll to shift said roll at a predetermined time, and means actuated by the closing of said circuit for forming a connection between said reciprocatory member and said shifting means.

2. In a printing press, the combination of an impression roll, a form roll operatively mounted with respect thereto, an automatic material feed mechanism adapted to successively feed sheets of material, a pair of feed rolls interposed between said mechanism and said form roll, an electric circuit having said feed rolls as terminals, a make and break device for controlling the closing of said circuit at a predetermined time, a reciprocatory member suitably operated by a moving part of said press, a movable bearing for said impression roll, a toggle mechanism connected to said bearing, and means actuated by the closing of said circuit to connect said toggle mechanism with said reciprocatory member, whereby said toggle is broken to vary the distance between said impression and form rolls.

3. In a printing press, the combination of an impression roll, a form roll operatively mounted with respect thereto, an automatic material feed mechanism adapted to successively feed sheets of material, a pair of feed rolls interposed between said mechanism and said form roll, an electric circuit having said feed rolls as terminals, a make and break device for controlling the closing of said circuit at a predetermined time, a reciprocatory member suitably operated by a moving part of said press, a movable bearing for said impression roll, a toggle mechanism connected to said bearing, a pin movably carried by said reciprocatory member, a lever secured to said toggle and having a portion located in the path of movement of said pin at certain times, and means actuated by the closing of said circuit to release said pin to engage said lever, whereby said toggle is broken to vary the distance between said impression and form rolls.

4. In a printing press, the combination of an impression roll, a form roll operatively mounted with respect thereto, an automatic material feed mechanism adapted to successively feed sheets of material, a pair of feed rolls interposed between said mechanism and said form roll, an electric circuit having said feed rolls as terminals, a make and break device for controlling the closing of said circuit at a predetermined time, a reciprocatory member suitably operated by a moving part of said press, a movable bearing for said impression roll, a toggle mechanism connected to said bearing, means to transmit movement of said reciprocatory member to said toggle, a magnet in said circuit, and a trip device controlled by said magnet for connecting said transmitting means to said reciprocatory member.

5. In a printing press, the combination of a rotary impression cylinder and coacting printing form, throw-off mechanism comprising an axis-adjusting crank, a reciprocating link having a sliding connection with said crank, a retractable trip carried by one of these parts and adapted when projected to engage a stop on the other to throw the crank, and automatic controlling means for said trip allowing it to protract only when no sheet is taken on the impression cylinder.

6. In a throw off mechanism for printing presses, a throw-off or adjusting crank, a slotted link reciprocating on a guide therefor on said crank, a movable trip pin carried by said link and adapted to project into its slot to engage a stop on the crank, and automatically controlled operating means for said trip pin.

7. In a printing press, the combination of an impression roll, a form roll intergeared therewith, an automatic material feed mechanism adapted to successively feed sheets of material, an electric circuit, a make and break device for controlling the closing of said circuit on a failure of a sheet to be fed, a reciprocatory member suitably operated by a moving part of said press, a movable bearing for said impression roll, a toggle mechanism connected to said bearing, and means actuated by the closing of said circuit to connect said toggle mechanism with said reciprocatory member, whereby said toggle is actuated to vary the distance between said impression and form rolls without affecting the rotation of either.

8. In a printing press, the combination of a rotary impression cylinder, an intergeared printing form, throw-off mechanism for effecting the relative movement between said cylinder and form to bring them into and out of coöperative relation one with the other without disconnecting their gearing, said throw-off mechanism including a crank, a reciprocatory member for effecting the movement of the crank, a normally operative trip, an electro-magnet controlling said trip, and means operative on the failure of a sheet to be fed for energizing said magnet to cause said trip to throw said crank and thus effect the relative movement between the said cylinder and form.

9. In a printing press, the combination of a rotary impression cylinder, an intergeared printing form, throw-off mechanism for effecting the relative movement between said cylinder and form to bring them into and out of coöperative relation one with the other without disconnecting their gearing, said throw-off mechanism including a crank, a reciprocatory member for effecting the movement of the crank, a rotary cam for actuating said member, a normally operative trip, an electro-magnet controlling said trip, and means operative on the failure of a sheet to be fed for energizing said magnet to cause said trip to throw said crank and thus effect the relative movement between the said cylinder and form.

10. In a printing press, the combination of a rotary impression cylinder and an intergeared rotary printing form, slidable bearings in which the said cylinder is journaled, toggle-links for shifting said bearings to move the impression cylinder toward and from the printing form without stopping rotation of these parts, and electrically controlled means rendered operative upon failure of a sheet to be taken on the impression cylinder for operating the said toggle-links and moving the impression cylinder out of printing contact with the said form, but not out of rotary engagement therewith, said electrically controlled means including a reciprocatory member.

11. A printing press having intergeared form and impression cylinders, one of which has bearings arranged to be shifted so as to separate the coacting printing faces thereof without affecting the rotation of either, and automatic throw-off mechanism for shifting said bearings and embodying a cam-actuated reciprocatory member, a connection between said member and said shiftable bearings, and electrical means rendered operative upon failure of a sheet to be taken by the impression cylinder for actuating said connection and thereby temporarily separating the form and impression cylinders without stopping the rotation of either.

SAMUEL LEWIS TUCKER.

Witnesses:

E. HAYWARD FAIRBANKS,

C. D. MCVAY.